US008011517B2

(12) United States Patent
Allen et al.

(10) Patent No.: US 8,011,517 B2
(45) Date of Patent: Sep. 6, 2011

(54) COMPOSITE MEMBRANES WITH PERFORMANCE ENHANCING LAYERS

(75) Inventors: Robert David Allen, San Jose, CA (US); James Lupton Hedrick, Pleasanton, CA (US); Young-Hye Na, San Jose, CA (US); Alshakim Nelson, Fremont, CA (US); Ratnam Sooriyakumaran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/624,633

(22) Filed: Nov. 24, 2009

(65) Prior Publication Data

US 2011/0120941 A1    May 26, 2011

(51) Int. Cl.
*B01D 29/00*   (2006.01)
*B01D 29/46*   (2006.01)
*B01D 39/00*   (2006.01)
*B01D 67/00*   (2006.01)

(52) U.S. Cl. .............. 210/490; 210/500.27; 210/500.35; 264/48

(58) Field of Classification Search ............ 210/500.27, 210/500.35, 490, 645, 502.1, 500.42; 428/304.4; 95/45–52; 96/4; 264/48
See application file for complete search history.

(56) References Cited

U.S. PATENT DOCUMENTS

| | | | |
|---|---|---|---|
| 4,056,456 A * | 11/1977 | Sano et al. | 204/165 |
| 4,970,034 A * | 11/1990 | Ly et al. | 264/46.4 |
| 5,041,225 A * | 8/1991 | Norman | 210/500.36 |
| 5,510,394 A * | 4/1996 | Hodgdon | 521/27 |
| 5,512,205 A * | 4/1996 | Lai | 252/182.14 |
| 5,998,200 A | 12/1999 | Bonaventura et al. | |
| 6,083,393 A * | 7/2000 | Wu et al. | 210/500.35 |
| 6,551,536 B1 | 4/2003 | Kwak et al. | |
| 6,569,932 B2 | 5/2003 | Hsiao et al. | |
| 7,067,606 B2 | 6/2006 | Mather et al. | |
| 7,316,919 B2 * | 1/2008 | Childs et al. | 435/177 |
| 7,381,331 B2 * | 6/2008 | Duong et al. | 210/500.42 |
| 7,381,471 B2 | 6/2008 | Augustine et al. | |
| 7,572,872 B2 | 8/2009 | Flodin et al. | |
| 7,604,746 B2 * | 10/2009 | Childs et al. | 210/640 |
| 2007/0238317 A1 | 10/2007 | Allen et al. | |
| 2008/0160104 A1 | 7/2008 | Ramesh et al. | |
| 2008/0214694 A1 | 9/2008 | Yokota et al. | |

FOREIGN PATENT DOCUMENTS

| | | |
|---|---|---|
| AU | 200157746 A1 | 2/2003 |
| CN | 1401417 A | 3/2003 |
| EP | 1 283 068 A1 | 2/2003 |

(Continued)

OTHER PUBLICATIONS

Fang Yao et al., "Antibacterial effect of surface-functionalized polypropylene hollow fiber membrane from surface-initiated atom transfer radical polymerization," *Journal of Membrane Science*, 319 (2008) 149-157.

(Continued)

*Primary Examiner* — Ana M Fortuna
(74) *Attorney, Agent, or Firm* — Shumaker & Sieffert, P.A.

(57) ABSTRACT

A composite membrane includes a filtration membrane with a surface; and a layer on the surface of the filtration membrane. The layer includes a polymer including a poly(ethylene glycol) moiety cross-linked with an ammonium salt or a precursor of an ammonium salt.

11 Claims, 6 Drawing Sheets

FOREIGN PATENT DOCUMENTS

| | | |
|---|---|---|
| FR | 2 843 045 A1 | 2/2004 |
| GB | 2 390 042 A | 12/2003 |
| JP | 2003-053163 | 2/2003 |
| JP | 2004-025102 | 1/2004 |
| WO | WO 2007/052260 A2 | 5/2007 |

OTHER PUBLICATIONS

Heru Susanto et al., "High-performance thin-layer hydrogel composite membranes for ultrafiltration of natural organic matter," *Water Research*, 42 (2008) 2827-2835.

T. Carroll et al., "Polyelectrolyte-grafted microfiltration membranes to control fouling by natural organic matter in drinking water," *Journal of Membrane Science*, 203 (2002) 3-13.

Jian Zhang et al., "Water Absorbency of Poly(sodium acrylate) Superabsorbents Crosslinked with Modified Poly(ethylene glycol)s," *Journal of Applied Polymer Science*, vol. 90, 1851-1856 (2003).

Hao Ju et al., "Crosslinked poly(ethylene oxide) fouling resistant coating materials for oil/water separation," *Journal of Membrane Science*, 307 (2008) 260-267.

D.E. Potts et al., "A Critical Review of Fouling of Reverse Osmosis Membranes," *Desalination*, 36 (1981) 235-264.

Jian Wu et al., "Crystallization of POSS in a PEG-Based Multiblock Polyurethane: Toward a Hybrid Hydrogel," *Mater. Res. Soc. Symp. Proc.*, vol. 847 (2005) 6 pages.

Marina Galia et al., "Monodisperse Polymer Beads as Packing Material for High-Performance Liquid Chromatography: Effect of Divinylbenzene Content on the Porous and Chromatographic Properties of Poly(styrene-co-divinylbenzene) Beads Prepared in Presence of Linear Polystyrene as a Porogen," *Journal of Polymer Science: Part A: Polymer Chemistry*, vol. 32, 2169-2175 (1994).

Timothy S. Haddad et al., "Nanostructured Hybrid Organic/Inorganic Materials, Silsesquioxane Modified Plastics," *Polymer Preprints*, vol. 40, No. 1 (2001) 2 pages.

"Hybrid Plastics™ POSS® Chemical Catalog" 2009 v. 1.01 (39 pages).

Woojin Lee et al., "Telechelic Poly(ethylene glycol)-POSS Amphiphiles at the Air/Water Interface," *Macromolecules*, 2007, 40, 682-688.

Irada S. Isayeva et al., "Amphiphilic Membranes Crosslinked and Reinforced by POSS*," *Journal of Polymer Science: Part A: Polymer Chemistry*, vol. 42, 4337-4352 (2004).

U.S. Appl. No. 12/624,605, filed Nov. 24, 2009 entitled "Polymeric Films Made from Polyhedral Oligomeric Silsesquioxane (POSS) and a Hydrophilic Comonomer".

* cited by examiner

COMPOSITE MEMBRANES WITH PERFORMANCE ENHANCING LAYERS

TECHNICAL FIELD

The present disclosure relates to coating compositions that may be cured to form a performance enhancing layer on a filtration membrane, as well as to methods for making them.

BACKGROUND

Membrane technologies such as microfiltration (MF), ultrafiltration (UF), nanofilitration (NF), and reverse osmosis (RO) have been widely used for water purification because they are energy efficient, cost-effective and simple to operate. However, many commercial membranes experience substantial flux declines when they are exposed to contaminants such as, for example, inorganic salts, emulsified oil droplets, and natural organic matter. These contaminants in the water can deposit on the membrane surface and/or block the pores of the membrane, which foul the membrane and decrease its useful life.

Current approaches to address this fouling problem include pretreatment of the feed water, periodic depressurization of the membrane tube, flow reversal, and use of cleaning agents to remove fouled films from membrane surface. These techniques require energy and/or additional chemicals, and reduce productive membrane operating time, which directly contributes to increased operating costs.

Modifying a surface of the membrane with a fouling-resistant material is another approach that can potentially increase the useful life of the membrane and reduce operating costs. Materials such as, for example, nanoparticles, enzymes, and epoxy compounds, have demonstrated some fouling resistance, but there is still a need to develop highly water-permeable, anti-fouling materials that retain high water flux through the membrane over an extended membrane operating time.

Quarternary ammonium salts have anti-microbial properties, and poly(ethylene glycol) (PEG) has been used to reduce organic or bio-fouling. UF and MF membranes with surface-grafted copolymer brushes of mono-functionalized PEG and cross-linkable quarternary ammonium compounds exhibited some antibacterial and anti-fouling properties. However, attaching the brushes to the membrane required multiple reaction steps to initiate polymerization from the membrane surface, which limits the usefulness of the surface grafting technique to a narrow range of specific membranes.

SUMMARY

In general, the present disclosure relates to a coating composition including hydrophilic functional compounds that may be coated on a filtration membrane and cured to form a layer thereon. The composite membrane including the layer can have enhanced performance that may include, but is not limited to, improved anti-microbial properties and/or improved resistance to fouling by organic or biological materials.

The coating composition includes a polymerizable hydrophilic compound, a polymerizable compound containing an ammonium salt or a precursor of an ammonium salt, and an optional solvent, preferably water. In certain embodiments, the coating composition is radiation curable, particularly ultraviolet (UV) curable, to form a layer on the membrane.

In one aspect, the present invention is directed to a composite membrane including a filtration membrane with a surface; and a layer on the surface of the filtration membrane. The layer includes a poly(ethylene glycol) moiety crosslinked with an ammonium salt or a precursor of an ammonium salt.

In another aspect, the present invention is directed to a method for making a composite membrane. The method includes applying a coating composition to a surface of a filtration membrane, wherein the coating composition includes a hydrophilic compound (A) including one or more polymerizable functional groups, and a polymerizable compound (B) containing an ammonium salt or a precursor of an ammonium salt. The coating composition is then cured to form a layer on the membrane.

The cured layer of the coating composition, which in preferred embodiments is a highly hydrated polymer gel that holds many times its weight in trapped water (referred to herein as a hydrogel), exhibits extremely high water uptake and permeability. The water uptake and permeability of the hydrogel layer can be easily controlled not only by manipulating the composition ratio between the polymerizable hydrophilic compound and the polymerizable compound containing an ammonium salt, but also by varying the water content in the coating composition.

In some embodiments, these super water-absorbing hydrogel layers have a number of advantages as antimicrobial and anti-fouling coatings in a composite membrane structure. For example, the preferred hydrogels originate from polar components in the coating composition, which can reduce organic or emulsified oil fouling in the cured hydrogel layer.

The preferred hydrogel layers can be made from two different monomers, which can each be designed to provide the hydrogel layer with particular properties such as, for example, protein resistance and anti-microbial properties. The synergistic effect of these two functions can be highly effective in preventing bio-fouling.

In some embodiments, when the coating is applied to a membrane to reduce fouling, the composite membrane undergoes an initial water-flux drop, but the high water permeability of the hydrogel layer minimizes initial flux drop and retains high water flux over extended operating times.

The details of one or more embodiments of the invention are set forth in the accompanying drawings and the description below. Other features, objects, and advantages of the invention will be apparent from the description and drawings, and from the claims.

DETAILED DESCRIPTION

In one aspect, the present invention relates to a coating composition that may be applied to a surface of a filtration membrane. The coating composition includes a polymerizable hydrophilic compound, a polymerizable compound containing an ammonium salt or a precursor of an ammonium salt, and an optional solvent. In certain embodiments, the coating composition is radiation curable, particularly ultraviolet (UV) curable, to form a layer on the membrane. In a preferred embodiment, the cured layer includes a poly(ethylene glycol) moiety crosslinked with an ammonium salt or a precursor of an ammonium salt.

The polymerizable hydrophilic compounds in the coating composition may be selected from monomers, oligomers, polymers, or mixtures thereof. Preferred polymerizable hydrophilic compounds may include a wide variety of polymerizable functional groups, but compounds with (meth) acryl functionality (wherein "(meth)acryl or (meth)acrylate" refers to an acrylate and a methacrylate) have been found to be particularly useful.

The (meth)acryl functional groups on the polymerizable hydrophilic compounds are bonded to a core structural group, which may be based on a wide variety of hydrophilic organic structures. Particularly preferred polymerizable hydrophilic compounds are derivatives of poly(ethylene glycol) (PEG).

The polymerizable hydrophilic compounds in the coating composition preferably include one or more (meth)acryl functional monomers, oligomers or polymers, which are preferably multifunctional. Examples of suitable (meth)acryl functional hydrophilic monomers include poly(ethylene glycol) acrylate, poly(ethylene glycol) diacrylate, poly(ethylene glycol) methacrylate, acrylic acid, 2-hydroxyethyl methacrylate, 2-hydroxyethyl acrylate, 2-(2-ethoxyethoxy)ethyl acrylate, tetrahydrofurfuryl acrylate, and the like.

Multi-functional polyethylene glycol (PEG) (meth)acrylate monomers, preferably PEG diacrylates (herein generally referred to as PEGDA), and dimethacrylates have been found to have many beneficial properties in the coating composition.

Preferred PEGDA monomers have a molecular weight ($M_w$) of about 150 to about 10000, preferably about 150 to about 5000, and more preferably about 150 to 1000.

The polymerizable compounds containing an ammonium salt or a precursor of an ammonium salt, which may be selected from monomers, oligomers, polymers, or mixtures thereof, generally have the formula $[(RNR_1R_2R_3)^+X^-]$ wherein R is any functional group polymerizeable with the functional group(s) on the polymerizable hydrophilic compound, N is nitrogen, $R_1$-$R_3$, which may be the same or different, may be hydrogen or alkyl, and X is a halide, preferably Cl.

The functional group R on the compounds including an ammonium salt or an ammonium salt precursor preferably includes (meth)acrylate functionality. Examples of suitable monomers with an ammonium salt or ammonium salt precursor include 2-aminoethyl methacrylate hydrochloride, 2-dimethylaminoethyl methacrylate hydrochloride, and dimethylaminoethyl methacrylate-methyl chloride, and the like.

The ratio by weight in the coating composition between the polymerizable hydrophilic monomer and the polymerizable monomer with an ammonium salt or salt precursor can be varied over a wide range to control the crosslinking density of the polymerized (cured) reaction product. For example, as discussed in more detail below, the ratio by weight between a (meth)acrylate functional monomer like PEGDA and a crosslinkable functional monomer with an ammonium salt or salt precursor can typically range from about 1:1 to about 3:1. As the relative ratio of $[(RNR_1R_2R_3)^+X^-]$ to PEGDA in the coating composition increases, the cross-linking density decreases. As a result, presently available evidence indicates that the water-absorbing capability (water uptake) of the reaction product increases.

The coating composition also preferably includes a solvent, which can be added to the pre-polymerization mixture to dissolve reactants and/or to control the crosslinking density of the cured reaction product. Aqueous solvents are preferred, and water is particularly preferred to provide a hydrogel layer as a reaction product with a high water content. The amount of the solvent in the coating composition may vary widely, but amounts of 50 wt % to 80 wt %, based on the total weight of the coating composition, have been found to provide a cured hydrogel product with excellent water absorption capability.

The coating composition is preferably radiation curable, and may be cured via visible light, electron beam, thermal initiation, or cationic initiation to form a free-standing film or layer. In a preferred embodiment, the coating compositions are ultraviolet ("UV") radiation-curable, and include a polymerizable hydrophilic compound, a polymerizable compound including an ammonium salt or a precursor of an ammonium salt, an optional solvent, and a photoinitiator. The photoinitiator is typically present in an amount of about 0.1 wt % to about 10 wt %, based on the total weight of the coating composition.

Photoinitiators suitable for use in the coating composition with functional monomers having (meth)acrylate functional groups are alpha-cleavage type photoinitiators and hydrogen abstraction-type photoinitiators. The photoinitiator may include other agents such as coinitiators or photoinitiator synergists that aid the photochemical initiation reaction. Suitable cleavage type photoinitiators include alpha, alpha-diethoxyacetophenone (DEAP), dimethoxyphenylacetophenone (commercially available under the trade designation IRGACURE 651 from Ciba Corp., Ardsley, N.Y.), hydroxy-cyclo-hexylphenylketone (commercially available under the trade designation IRGACURE 184 from Ciba Corp.), 2-hydroxy-2-methyl-1-phenylpropan-1-one (commercially available under the trade designation DAROCUR 1173 from Ciba Corp.), a 25:75 blend of bis-(2,6-dimethoxybenzoyl)-2,4,4-trimethylpentyl phosphine oxide and 2-hydroxy-2-methyl-1-phenylpropan-1-one (commercially available under the trade designation IRGACURE 1700 from Ciba Corp.), a 50:50 blend of 2-hydroxy-2-methyl-1-phenylpropan-1-one and 2,4,6-trimethylbenzoyl-diphenylphosphine oxide (TPO, commercially available under the trade designation DAROCUR 4265 from Ciba Corp.), phosphine oxide, 2,4,6-trimethyl benzoyl (commercially available under the trade name IRGACURE 819 and IRGACURE 819DW from Ciba Corp.), 2,4,6-trimethylbenzoyl-diphenylphosphine oxide (commercially available under the trade designation LUCIRIN from BASF Corp., Mount Olive, N.J.), and a mixture of 70% oligo 2-hydroxy-2-methyl-4-(1-methylvinyl)phenylpropan-1-one and 30% 2-hydroxy-2-methyl-1-phenylpropan-1-one) (commercially available under the trade designation KIP 100 from Sartomer, Exton, Pa.), and aromatic ketones such as the compounds available under the trade designation TINOCURE from Ciba Corp. Suitable hydrogen abstraction-type photoinitiators include benzophenone, substituted benzophenones (such as that commercially available under the trade designation ESCACURE TZT from Fratelli-Lamberti, sold by Sartomer, Exton, Pa.), and other diaryl ketones such as xanthones, thioxanthones, Michler's ketone, benzil, quinones, and substituted derivatives of all of the above. Preferred photoinitiators include DAROCUR 1173, KIP 100, benzophenone, IRGACURE 184 and TINOCURE.

Preferred photoinitiators include benzophenone, 4-methylbenzophenone, benzoyl benzoate, phenylacetophenones, 2,2-dimethoxy-2-phenylacetophenone, alpha,alpha-diethoxyacetophenone, hydroxycyclo-hexylphenylketone, 2-hydroxy-2-methyl-1-phenylpropan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one, 2,4,6-trimethylbenzoyl-diphenylphosphine oxide, and combinations thereof.

The coating compositions may be applied on a major surface of a filtration membrane and hardened to form a performance enhancing layer thereon. In a preferred embodiment, the performance enhancing layer includes a poly(ethylene glycol) moiety crosslinked with an ammonium salt or a precursor of an ammonium salt.

Suitable filtration membranes include, but are not limited to, microfiltration (MF), ultrafiltration (UF), nanofiltration (NF), reverse osmosis (RO) or forward osmosis (FO) membranes. The resulting composite membrane may optionally be further supported by a backing material such as, for example, a non-woven polyester fabric. In some embodiments, the backing material has a thickness of about 120 μm.

The coating composition can further optionally include fillers, viscosity modifiers, and the like to aid in handling the composition and/or to otherwise modify its properties. For example, to make the coating composition more viscous and coatable on the surface of a substrate using a conventional coating technique, materials with high molar mass such as, for example, poly(ethylene oxide), may be added in an amount sufficient to provide a suitable viscosity. In addition, to increase the viscosity of the formulation, partial UV curing of the formulation may be used before coating.

The coating compositions can be applied to the filtration membranes by a variety of methods including, for example, spraying, painting, rollcoating, brushing, fan coating, curtain coating, spreading, air knife coating, die-coating, vacuum coating, spin coating, electrodeposition, and dipping.

The thickness of the coatings will vary with the application, and thinner coating layers can increase the water flux of the composite membrane. Typically, the coatings will have a dry thickness of about 50 nm to about 5 μm, preferably about 50 nm to about 2 μm, more preferably about 50 nm to 500 nm. However, thicker or thinner coatings are also contemplated depending on, for example, the desired water flux, water uptake, and rejection properties of the composite membrane.

The present invention also provides methods for coating that involve applying the coating composition to a substrate such as, for example, a filtration membrane, and allowing the coating composition to harden (e.g., by exposing the coating composition to radiation such as UV light). Preferred coatings are cured by exposing the coating to radiation having a wavelength in the range of about 200 nm to about 800 nm. Preferred coatings, which are designed to be cured by ultraviolet or visible light, are preferably exposed to about 200 mJ/cm² to about 1000 mJ/cm² and more preferably exposed to about 500 mJ/cm² to about 800 mJ/cm².

As shown in the examples below, the anti-fouling resistance of the composite membrane is significantly enhanced compared to that of an uncoated membrane.

The invention will now be further described with reference to the following non-limiting examples.

EXAMPLES

Preparation of Free-Standing Films

Poly(ethylene glycol) diacrylate (Mw: 700, Aldrich Corp., St. Louis, Mo.; hereafter referred to as PEGDA), 2-aminoethyl methacrylate hydrochloride (99%, Aldrich; hereafter referred to generally as $RNH_3Cl$), D.I water and 1% (w/w) of water-soluble photoinitiator (2-hydroxycyclohexyl phenyl ketone) were mixed in a nitrogen glove box and stirred overnight. The weight ratio between poly(ethylene glycol) diacrylate and 2-aminoethyl methacrylate hydrochloride was varied from 1:1 to 3:1, and water content was also varied from 50% (w/w) to 80% (w/w) to control the cross-linking density of the UV-cured hydrogel thin films.

The mixed solution was sandwiched between two quartz plates, which were covered with Teflon films and separated by a spacer. The solution was then polymerized by exposure to 365-nm UV light for 90 s at 9 mW/cm². The cross-linked films obtained by this process were kept in a large amount of deionized water.

The water uptake (S) was calculated by measuring the weight of dried film ($W_d$) and wet film ($W_s$) through the equation $S=W_s-W_d/W_d \times 100$. Water permeability was measured by stirred ultrafiltration cell at 10 psi and molecular weight cutoff (MWCO) was determined by filtering 0.5% standard polyethylene glycol solutions with molar mass from 200 to 35,000. Water uptake, permeability and MWCO of the hydrogel films prepared by various formulations are summarized in FIG. 1 and Table 1.

Figure 1:
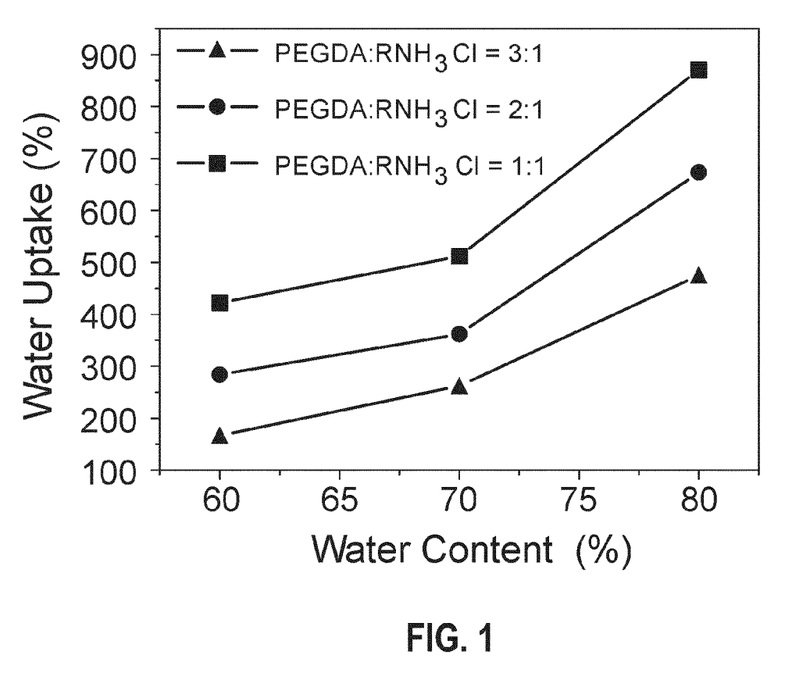
FIG. 1 is a plot of the pure water uptake of free standing films vs. water content added in prepolymerization mixtures of PEGDA and $RNH_3Cl$.

The water uptake was varied from 165% to 900% depending on the composition ratio between PEGDA and $RNH_3Cl$, and on the water content in prepolymerization mixture. As the relative ratio of $RNH_3Cl$ to the PEGDA and the content of water increased, the cross-linking density of the films decreased. As a result, the water-absorbing capability (water uptake) of the films increased.

The water permeability and MWCO data of the free-standing films which are synthesized by a 2:1 weight ratio of PEGDA and $RNH_3Cl$ with various amounts of water are summarized in Table 1. The MWCO is the size designation in Daltons for membranes and is the molecular weight of the reference polyethylene glycol that is 90% rejected by the membranes.

TABLE 1

| Water content (w/w %) in pre-polymerization mixture | Water Permeability (L μm m$^{-2}$ h$^{-1}$ atm$^{-1}$) | MWCO (kDa) |
| --- | --- | --- |
| 60% | 51.24 | — |
| 70% | 72.30 | 2.7 |
| 80% | 196.38 | 6.0 |

Extremely high water permeability values (196 L μm m$^{-2}$ h$^{-1}$ atm$^{-1}$) were observed in a film prepared by adding 80% (w/w) water into the prepolymerization mixture of PEGDA and $RNH_3Cl$ (weight ratio=2:1). The MWCO values (less than 6 kDa) of these films are proper enough to reject organic- or bio-foulants, implying that the films can significantly reduce membrane internal fouling (blocking internal pores of the membrane by foulants).

Preparation of Composite Membranes and Evaluation of Anti-Fouling Efficiency

For making composite membranes, high molar mass poly (ethylene oxide) (Mn=1,000,000 g/mol) was added to the pre-polymerization mixture of PEGDA, RNH$_3$Cl, water, and photoinitiator to increase the viscosity of the coating solution. A PSF support membrane was soaked in the mixed solvents of glycerol and methanol (15% glycerol) to remove any dust on the top surface and dried in air before coating.

The viscous prepolymerization mixture was spread on the top surface of the dried PSF support membrane using a Gardco automatic drawdown machine with a coating rod (size: 0, coating speed: 2.5 cm/s), and UV cured.

Figure 2A:
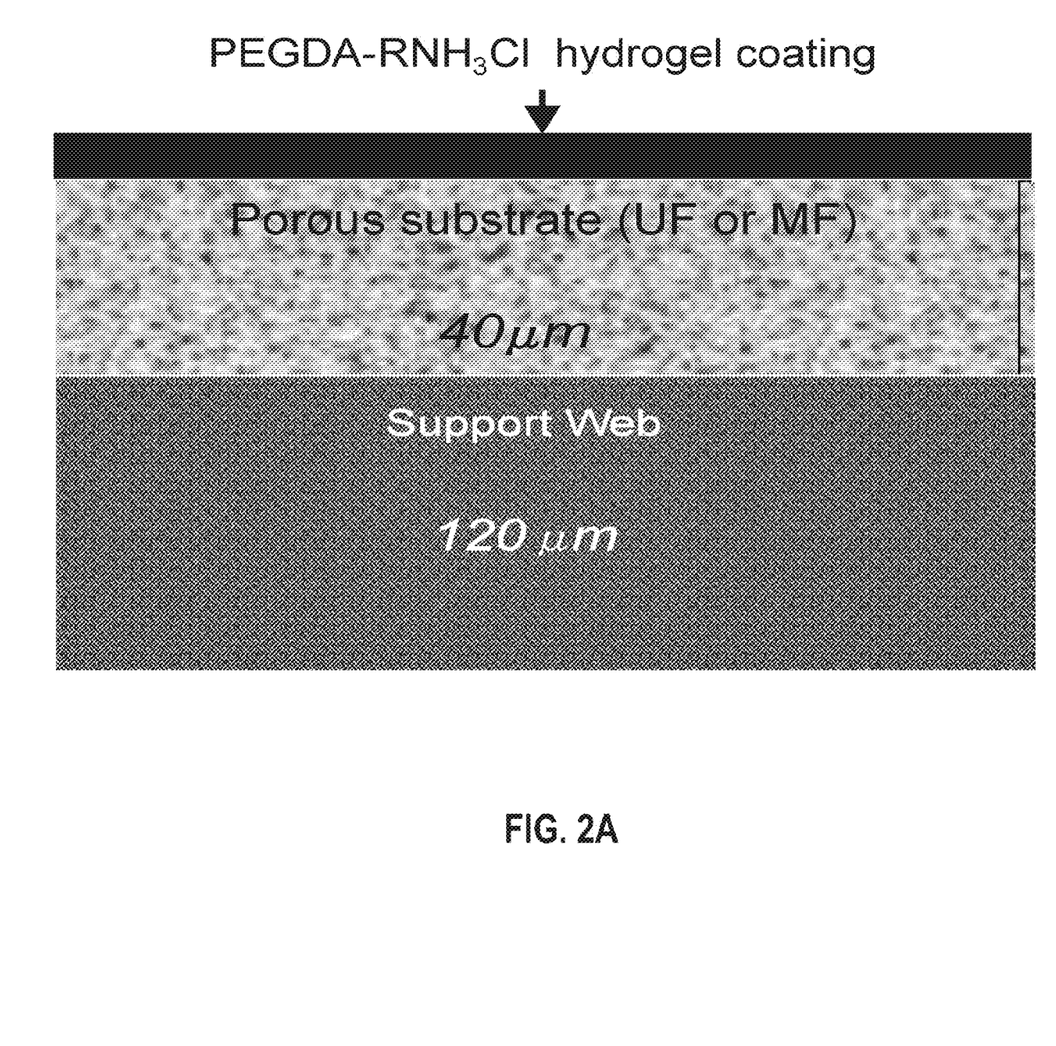
FIG. 2(a) is a cross-sectional structure of a composite membrane.

For evaluating anti-fouling efficiency of these hydrogel films, separation performance of the composite membranes (membrane coated with hydrogel materials, FIG. 2(a)), an uncoated PSF support membrane, and a commercial ultrafiltration membrane from Sepro Membranes, Inc., Oceanside, Calif. was studied using crossflow filtration system with synthetic feed waters including target foulants such as oils and proteins.

Figure 2B:
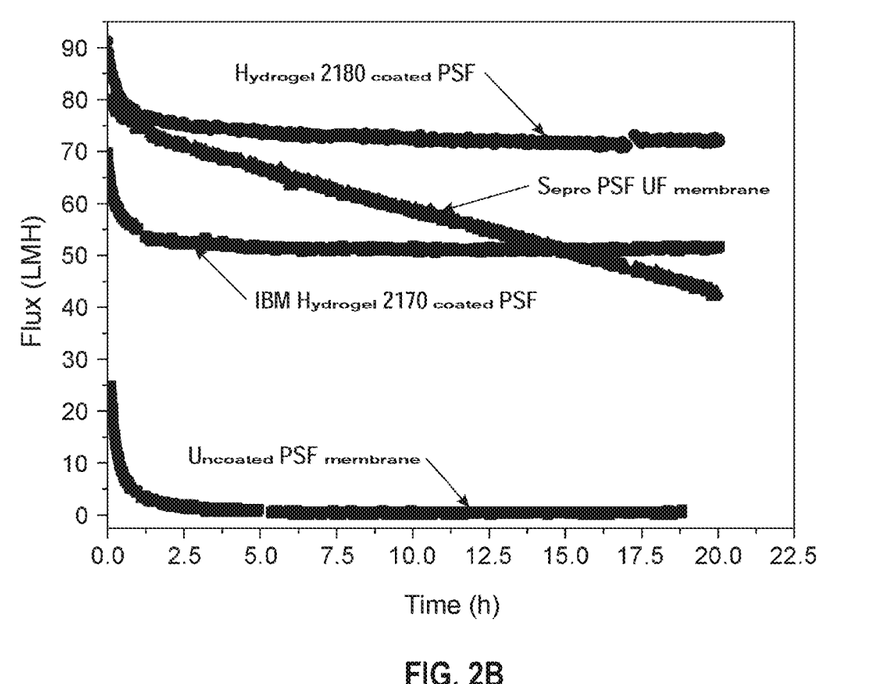
FIG. 2(b) is a plot of permeate flux vs. time for oil/water emulsion cross-flow filtration tests of hydrogel-coated, uncoated PSF support, and commercial ultrafiltration membranes.

FIG. 2(b) presents the water permeate flux as a function of operation time in oil-water emulsion crossflow filtration. Two composite membranes where the coating layers were prepared by adding 70% (w/w) and 80% (w/w) water into PEGDA and RNH$_3$Cl pre-polymerization mixtures were tested. The weight ratio between PEGDA and RNH$_3$Cl was fixed to 2:1, and both coating materials were denoted as 'hydrogel 2170' and 'hydrogel 2180,' respectively, in the FIG. 2(b).

The water flux of the uncoated membrane dropped significantly within 2 hours, which indicates severe oil fouling (FIG. 2(b)). The commercial ultrafiltration membrane also showed slow flux decline due to oil-fouling over time (FIG. 2(b)). However, both hydrogel-coated membranes exhibited almost no flux change after 1 hour, and retained very high water flux (ca. 80 LMH for hydrogel 2180 and ca. 55 LMH for hydrogel 2170, FIG. 2(b)) for a long period of time. The flux difference between the two coated membranes is due to the permeability difference of the hydrogel materials (higher water content in prepolymerization mixture induces higher water permeability of the resulting film).

Figure 3A:
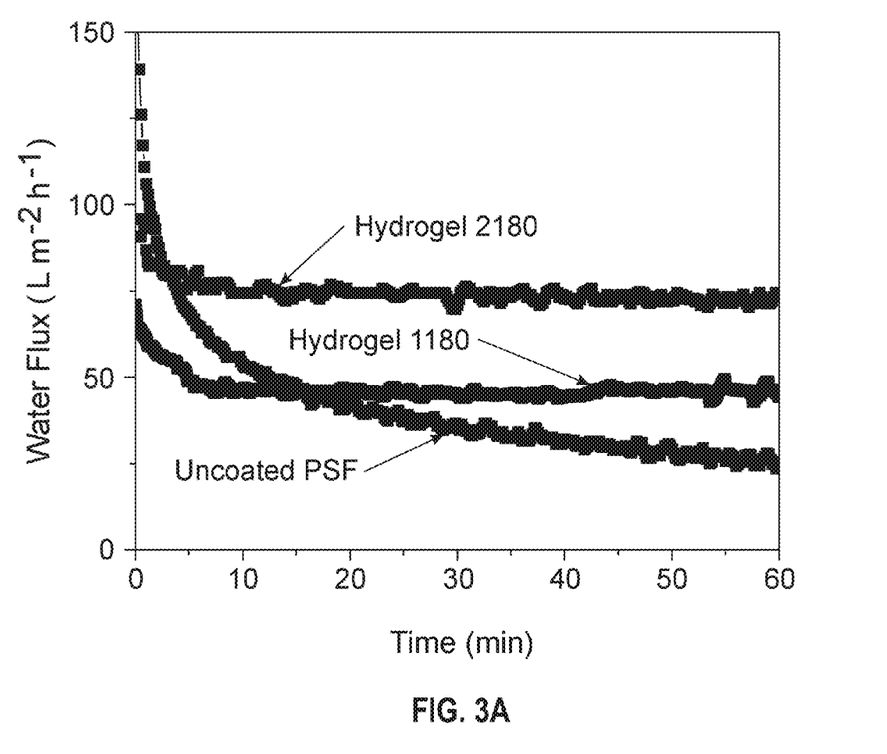
FIG. 3(a) is a plot of permeate flux vs. time in cross-flow filtration of a protein feed solution with composite membranes and an uncoated PSF membrane.

FIG. 3(a) shows bio-fouling resistance of hydrogel-coated membranes compared to an uncoated PSF membrane. Two composite membranes designated as 'hydrogel 1180' and 'hydrogel 2180' were tested against the uncoated PSF membrane, and the water flux was monitored as a function of operation time in the crossflow filtration of protein (Bovine Serum Albumin, BSA) feed solution.

'Hydrogel 1180' and 'hydrogel 2180' represent the coating compositions including 80% (w/w) water in the pre-polymerization mixtures of 1:1 and 2:1 weight ratios of PEGDA and RNH$_3$Cl, respectively. The uncoated PSF membrane showed significant flux drop by protein fouling within 20 min (FIG. 3(a)). However, both hydrogel-coated composite membranes showed excellent fouling resistance to the target protein, BSA (no flux decline over time), even though the coating layers have positively charged ammonium moiety which may be more interactive to the negatively charged BSA (isoelectric point of PSA is around 4.7).

Figure 3B:
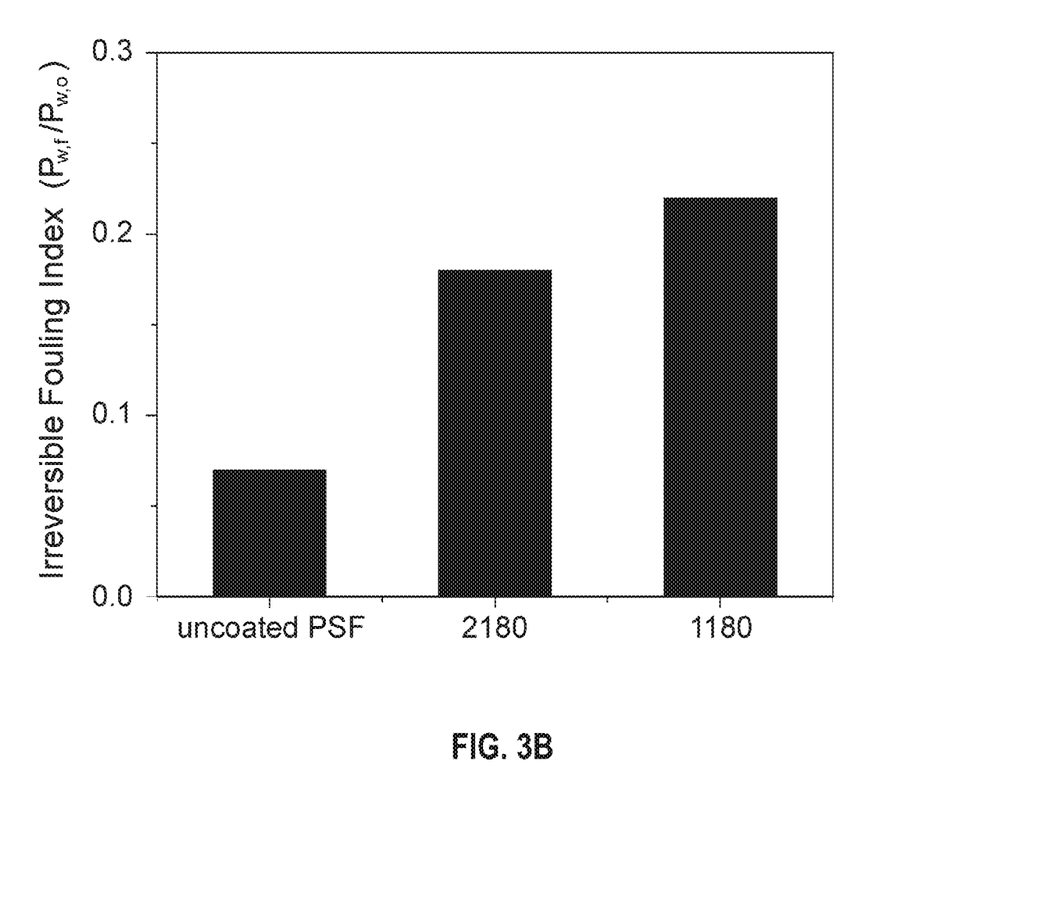
FIG. 3(b) is a plot of the flux recovery index of uncoated PSF, hydrogel 2180 coated, and hydrogel 1180 coated membranes, with $P_{w,o}$=pure water permeance measured before the fouling experiment, and $P_{w,f}$=pure water permeance measured after the fouling experiment.

This result indicates that the PEGDA component on the coating layer is still effectively blocking protein adhesion. The absolute water flux of composite membrane prepared with hydrogel 2180 was slightly higher than the flux of the composite membrane prepared with hydrogel 1180, which is opposite the trend of water uptake and permeability of coating layers (hydrogel 1180 shows higher water uptake (871%) than hydrogel 2180 (673%)). This is likely due to higher charge density on the surface of hydrogel 1180 compared to the surface of hydrogel 2180, resulting in relatively higher adhesion of negatively charged BSA on the surface. Both composite membranes also reduced irreversible fouling compared to bare PSF membrane, resulting in better flux recovery after fouling experiment (FIG. 3(b)).

The hydrogel coating materials provided additional advantage in protein rejection as well. The composite membranes showed very high rejection of the target protein BSA (more than 97% BSA rejection), compared to the uncoated PSF membrane (0% rejection). This may be due to the higher MWCO value for uncoated PSF (100 KDa) compared to the lower MWCO of the hydrogel coating materials (ca. 6.0 KDa). The Mw of BSA is 67 KDa.

Preparatory Examples

Example 1

Hydrogel 2170

1 g of poly(ethylene glycol) diacrylate (Mw: 700, Aldrich), 0.5 g of 2-aminoethyl methacrylate hydrochloride (99%, Aldrich), 3.5 g of D.I water and 0.015 g of water-soluble photoinitiator (2-hydroxycyclohexyl phenyl ketone) were mixed in a nitrogen glove box and stirred overnight. Preparation of free-standing film, composite membrane, and characterization of the film were done in the same manner as described above.

The water uptake, water permeability, and MWCO of the film were 362%, 72.3 L μm m$^{-2}$ h$^{-1}$ atm$^{-1}$, and 2.7 kDa, respectively.

Example 2

Hydrogel 2180

0.67 g of poly(ethylene glycol) diacrylate (Mw: 700, Aldrich), 0.33 g of 2-aminoethyl methacrylate hydrochloride (99%, Aldrich), 4 g of D.I water and 0.01 g of water-soluble photoinitiator (2-hydroxycyclohexyl phenyl ketone) were mixed in a nitrogen glove box and stirred overnight. Preparation of a free-standing film, composite membrane, and characterization of the film were done in the same manner as described above.

The water uptake, permeability and MWCO were 673%, 196.38 L μm m$^{-2}$ h$^{-1}$ atm$^{-1}$, and 6.0 kDa, respectively.

Figure 4:
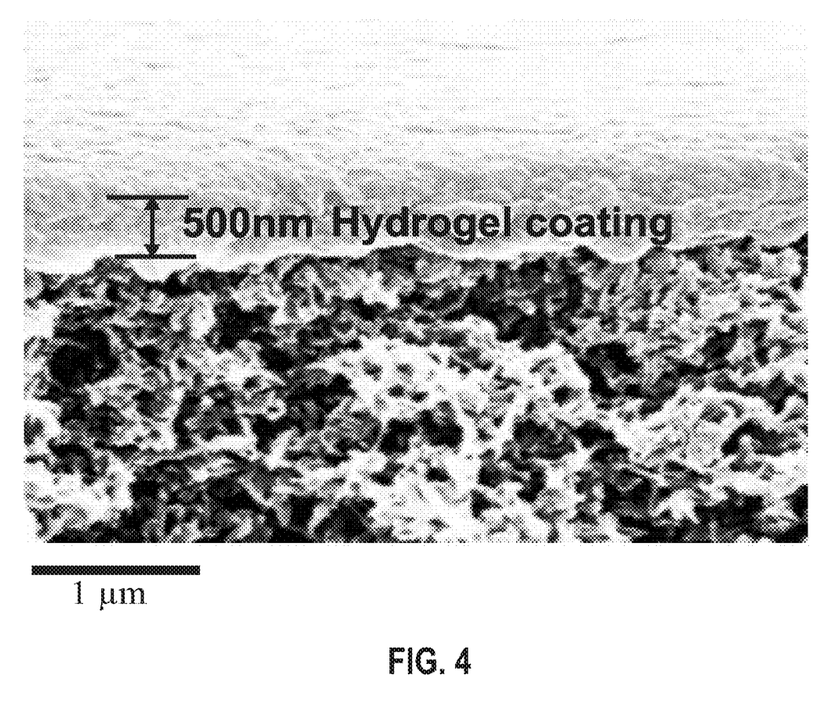
FIG. 4 is a cross-sectional SEM image of a composite membrane.

FIG. 4 shows a cross-sectional SEM image of the composite membrane, and the thickness of hydrogel coating layer is approximately 500 nm in a dry state.

Example 3

Hydrogel 1180

0.5 g of poly(ethylene glycol) diacrylate (Mw: 700, Aldrich), 0.5 g of 2-aminoethyl methacrylate hydrochloride (99%, Aldrich), 4 g of D.I water and 0.01 g of water-soluble photoinitiator (2-hydroxycyclohexyl phenyl ketone) were mixed in a nitrogen glove box and stirred overnight. Preparation of free-standing film, composite membrane, and characterization of the film were done in the same manner as described above. The water uptake of the film was 871%.

Example 4

Hydrogel 3180

0.75 g of poly(ethylene glycol) diacrylate (Mw: 700, Aldrich), 0.25 g of 2-aminoethyl methacrylate hydrochloride (99%, Aldrich), 4 g of D.I water and 0.01 g of water-soluble photoinitiator (2-hydroxycyclohexyl phenyl ketone) were mixed in a nitrogen glove box and stirred overnight. Preparation of free-standing film, composite membrane, and characterization of the film were done in the same manner as described above. The water uptake of the film was 475%.

Example 5

Evaluation of Anti Fouling Efficiency of Composite Membranes Prepared by Hydrogels 2170 and 2180

Crossflow filtration of oil/water emulsion was carried out to monitor permeate flux of hydrogel coated composite membranes (2170 and 2180) using a commercial crossflow filtration system. An oil/water emulsion was prepared by blending vegetable oil/surfactant (9:1) with 3 L of deionized water (concentration of oil: 1500 ppm). The crossflow filtration was conducted at 25° C., and the crossflow rate was 0.35 Gal/min at 100 psi. Permeate flux was recorded by digital balances connected to a computer.

Hydrogel 2170 and 2180 coated composite membranes showed very high and constant permeate flux for more than 20 hours (55 LMH for hydrogel 2170 and 80 LMH for hydrogen 2180), while the uncoated PSF membrane showed severe flux drop after 2 hours. These data are plotted in FIG. 2(b).

Example 6

Evaluation of Bio-Fouling Resistance of Composite Membranes Prepared by Hydrogels 2180 and 1180

Crossflow filtration of protein feed solution was carried out to monitor permeate flux of hydrogel 2180 and hydrogel 1180 coated composite membranes using a commercial crossflow filtration system. A protein feed solution was prepared by dissolving 5 g of Bovine Serum Albumin (BSA) in 5 L of deionized water including 0.1 M phosphate buffer (pH 7.4). The crossflow filtration was conducted at 25° C., and the crossflow rate was 0.8 L/min at 30 psi. Permeate flux was recorded by digital balances connected to a computer.

Hydrogel 2180 and hydrogel 1180 coated composite membranes showed very constant permeate flux for 60 min (75 LMH for hydrogel 2180 and 45 LMH for hydrogel 1180), while the uncoated PSF membrane showed severe flux drop after 20 min (150 LMH to less than 40 LMH). These data are plotted in FIG. 3(a).

Hydrogel 2180 and hydrogel 1180 coated composite membranes also showed high BSA rejection (97.0% for hydrogel 2180 and 97.6% for hydrogel 1180), while the uncoated PSF membrane showed 0% BSA rejection.

Example 7

Irreversible Bio-Fouling Determination (Flux Recovery) on Composite Membranes Prepared by Hydrogels 2180 and 1180

Irreversible protein fouling was determined by comparing the pure water permeance of composite membranes (coated with hydrogel 2180 and hydrogel 1180) before and after a fouling experiment. Before a fouling experiment, the pure water flux ($P_{w,o}$) of the membranes was determined at the same pressure and crossflow rate that the fouling experiment took place (at 30 psi and 0.8 L/min). A fouling experiment was then performed on the membranes with protein feed solution for 60 min as described in Example 6. After the fouling experiment, the crossflow system was flushed with deionized water at least three times, after which water was allowed to circulate through the system for a total of 30 min for rinsing. The post-fouling pure water flux ($P_{w,f}$) was recorded after the rinsing cycle. Water flux recovery index was then calculated by dividing $P_{w,f}$ by $P_{w,o}$.

Composite membranes coated by hydrogel 2180 and hydrogel 1180 showed higher flux recovery index (0.50 and 0.58, respectively) compared to the uncoated PSF membrane (0.07), indicating that the coating materials reduce irreversible bio-fouling on the membrane surface. These data are plotted in FIG. 3(b).

Example 9

Protein Adhesion Experiment on Composite Membranes Prepared by Hydrogels 3180, 2180, and 1180

Protein adhesion experiments were performed using a fluorimetric assay of tagged Bovine Serum Albumin (BSA). 2.5 cm (1 in.) diameter samples were cut from flat-sheet composite membranes prepared by hydrogel 3180, hydrogel 2180, and hydrogel 1180.

The circular samples were placed in dead-end cells (Advantec MFS, #UHP 25, Dublin, Calif., USA) having an effective surface area of 3.5 cm$^2$ and washed several times with deionized water. R-NHS-tagged BSA solution (0.1 mg/mL in deionized water) was then added to the cells. After 10 min, the protein solutions were decanted and the membrane surface was washed repeatedly with deionized water.

The membranes were then air dried and tested for fluorescent intensity using either a fluorescent microscope (Leica DM IRBE, Bannockburn, Ill., USA) or a plate reader (Tecan Sapphire II, Mannedorf, Switzerland). The fluorescence intensity measured on the composite membranes was normalized by the intensity measured on a bare PSF membrane.

The normalized fluorescence intensity values of the composite membranes prepared by hydrogel 3180, hydrogel 2180, and hydrogel 1180 were 0.26, 0.85, and 1.5 respectively. This result indicates that the hydrogel 3180 and hydrogel 2180 are much more resistant to protein adhesion compared to the bare PSF ultrafiltration membrane, while hydrogel 1180 causes more protein adhesion due to high density of positive charge (BSA is negatively charged protein in neutral pH).

Based on the water uptake, permeability, and protein adhesion experiments described herein, hydrogel 2180 seems to be the best coating composition to retain the highest water flux with minimum bio-fouling for a long period of time.

Various embodiments of the invention have been described. These and other embodiments are within the scope of the following claims.

The invention claimed is:

1. A method for making a composite membrane, comprising:
applying a coating composition to a surface of a filtration membrane, wherein the coating composition comprises:
a hydrophilic compound (A) selected from at least one of PEG-methacrylates, PEG-acrylates, PEG-diacrylate, PEG-dimethacrylate, or PEG-diepoxides;
a polymerizable compound (B) selected from monomers with the formula $[(RNR_1R_2R_3)^+X^-]$, wherein R is a (meth)acryl functional group, N is nitrogen, $R_1$-$R_3$, which may be the same or different, may be hydrogen or alkyl, and X is a halide, wherein the ratio by weight of the compound (A) to the compound (B) is about 1:1 to about 3:1; and
about 50 wt % to about 80 wt % water; and
curing the composition to form a layer on the membrane.

2. The method of claim 1, wherein the filtration membrane is selected from the group consisting of microfiltration (MF), ultrafiltration (UF), nanofilitration (NF), reverse osmosis (RO), forward osmosis (FO) membranes, and combinations thereof.

3. The method of claim 1, wherein the layer has a dry thickness of about 50 nm to about 5 μm.

4. The method of claim 1, wherein the compound (A) is PEG-diacrylate.

5. The method of claim 1, wherein the compound (B) is selected from the group consisting of 2-aminoethyl methacrylate hydrochloride, 2-dimethylaminoethyl methacrylate hydrochloride, dimethylaminoethyl methacrylate-methyl chloride and combinations thereof.

6. The method of claim 1, wherein the coating composition further comprises a photoinitator.

7. The method of claim 6, wherein the coating composition is cured with UV light.

8. A composite membrane comprising:
a filtration membrane selected from the group consisting of microfiltration (MF), ultrafiltration (UF), nanofilitration (NF), reverse osmosis (RO), forward osmosis (FO), and combinations thereof;
a layer on the membrane, wherein the layer comprises the cured reaction product of:
a hydrophilic compound (A) selected from at least one of PEG-methacrylates, PEG-acrylates, PEG-diacrylate, PEG-dimethacrylate, or PEG-diepoxides;
a polymerizable compound (B) selected from monomers with the formula $[(RNR_1R_2R_3)^+X^-]$, wherein R is a (meth)acryl functional group, N is nitrogen, $R_1$-$R_3$, which may be the same or different, may be hydrogen or alkyl, and X is a halide, wherein the ratio by weight of the compound (A) to the compound (B) is about 1:1 to about 3:1; and
about 50 wt % to about 80 wt % water.

9. The composite membrane of claim 8, wherein the compound (A) is PEG diacrylate.

10. The composite membrane of claim 8, wherein compound (B) is selected from the group consisting of 2-aminoethyl methacrylate hydrochloride, 2-dimethylaminoethyl methacrylate hydrochloride, dimethylaminoethyl methacrylate-methyl chloride and combinations thereof.

11. The composite membrane of claim 8, wherein the layer has a dry thickness of about 50 nm to about 5 μm.

* * * * *